July 14, 1970  M. W. TREBBLE  3,520,050

TOOL CHANGE MECHANISMS

Filed Feb. 1, 1968  4 Sheets-Sheet 1

INVENTOR
MAURICE W. TREBBLE
BY
ATTORNEYS

July 14, 1970     M. W. TREBBLE     3,520,050

TOOL CHANGE MECHANISMS

Filed Feb. 1, 1968     4 Sheets-Sheet 2

INVENTOR
MAURICE W. TREBBLE
BY
ATTORNEYS

United States Patent Office 3,520,050
Patented July 14, 1970

3,520,050
TOOL CHANGE MECHANISMS
Maurice W. Trebble, London, England, assignor to The Glacier Metal Company Limited, Alperton, Wembley, England
Filed Feb. 1, 1968, Ser. No. 702,315
Claims priority, application Great Britain, Feb. 4, 1967, 5,478/67
Int. Cl. B23q 3/157
U.S. Cl. 29—568
7 Claims

ABSTRACT OF THE DISCLOSURE

A tool change mechanism includes a number of arms each having a clamp capable of holding a tool for use in a machine tool. A required tool for a particular operation is selected from an array of the arms and is moved first along a linear path and then through a semi-circular path to a position in which it is aligned with the spindle of the machine tool. A further linear movement is arranged to bring the selected tool into engagement with the chuck of the spindle. A given tool in the chuck is removed from the spindle by a reversed sequence of operations.

---

This invention relates to tool-change mechanisms and particularly, but not exclusively, to tool-change mechanisms for machine tools capable of being controlled to a particular working programme.

With complex work-pieces, it is possible to carry out a series of machining operations by a machine tool according to a predetermined programme which is recorded on a tape or other recording medium. Such a programme calls for the sequential use of a series of working tools and hitherto it has either been necessary to change the tools by hand or else to employ a magazine from which a particular tool required at any given time is selected and fitted into the spindle of the machine. However, manual fitting of tools for each working operation is clearly inconsistent with an otherwise automatically-operated machine tool, and the arrangements for selecting tools from a magazine, hitherto proposed, are complex.

According to the present invention there is provided a tool-change mechanism comprising a plurality of arms, each arm being capable of carrying a tool for use in an operation by a machine with which the mechanism is associated, and being capable of moving between a parking position and a position at which tool holding means of the associated machine can engage the said tool, and means for selectively moving said arms between said positions.

Further according to the present invention there is provided a tool-change mechanism for use in association with a machine tool, said mechanism comprising a plurality of arms each capable of storing a tool, and means for selectively moving the arms in a required sequence between a parking position at which the tools are stored by the arms and a position at which a selected tool is presented to holding means of the machine tool.

Still further according to the present invention there is provided a tool-change mechanism for use in association with a machine tool, said mechanism comprising a plurality of arms each capable of storing one tool for use in said machine, means for moving a selected arm along a linear path from a storage station to a ready station and from said ready station through an arc of substantially 180° to a station immediately in front of a tool-engaging means of the machine, and finally along a linear path until a selected arm presents the corresponding tool to the said tool-engaging means.

Yet further according to the present invention there is provided a machine tool comprising, a tool holding spindle, a chuck within said spindle, a drawbar coupled to said chuck, spring means biassing the drawbar so as to close the chuck, hydraulic means for overcoming the spring bias to open the chuck, a tool-change mechanism for selectively offering up tools to said spindle in a predetermined sequence, said mechanism including a plurality of tool-holding arms arranged in a semi-circular array and mounted on a carriage, hydraulic means for moving the carriage along a linear path from a retracted to an extended position, and means for moving a selected arm from said extended position through a semi-circular path to a position at which said selected arm presents the tool in alignment with the spindle, said carriage being retractable to bring said selected tool into engagement with the chuck.

An embodiment of a tool-change mechanism in accordance with the invention will now be described, by way of example, with reference to the accompanying diagrammatic drawings, in which.

Figure 1:
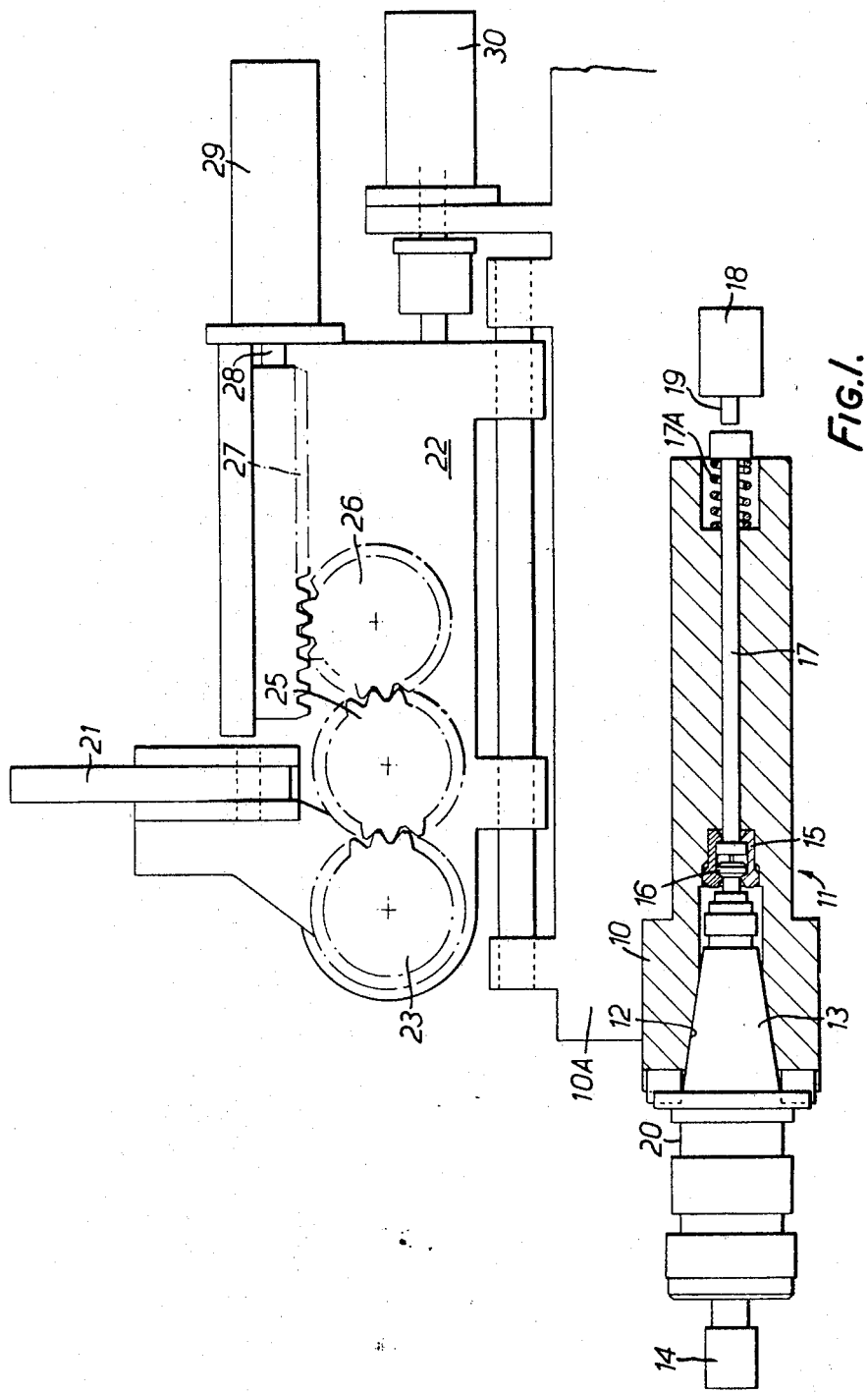
FIG. 1 is a side elevation of the mechanism and certain parts of an associated machine tool.
Figure 2:
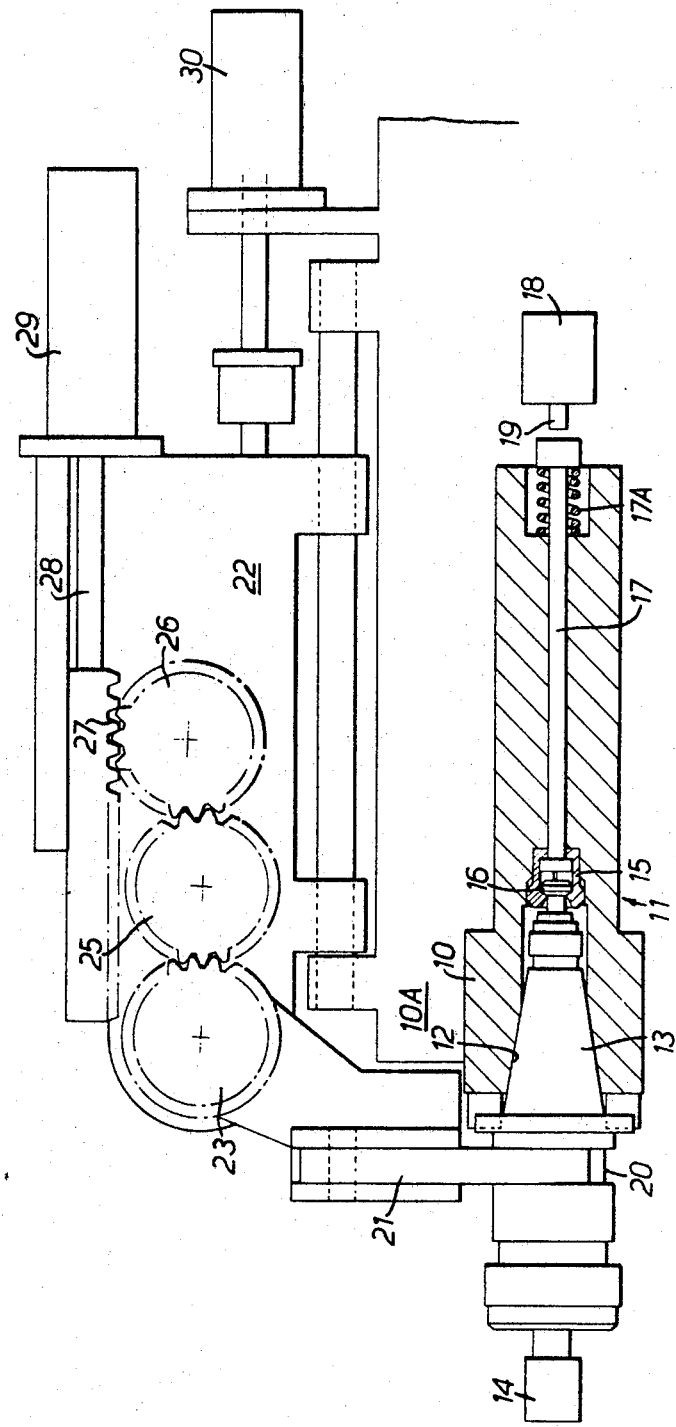
FIG. 2 is a view similar to FIG. 1, but with the tool-change mechanism at a different position in its cycle of operation.
Figure 3:
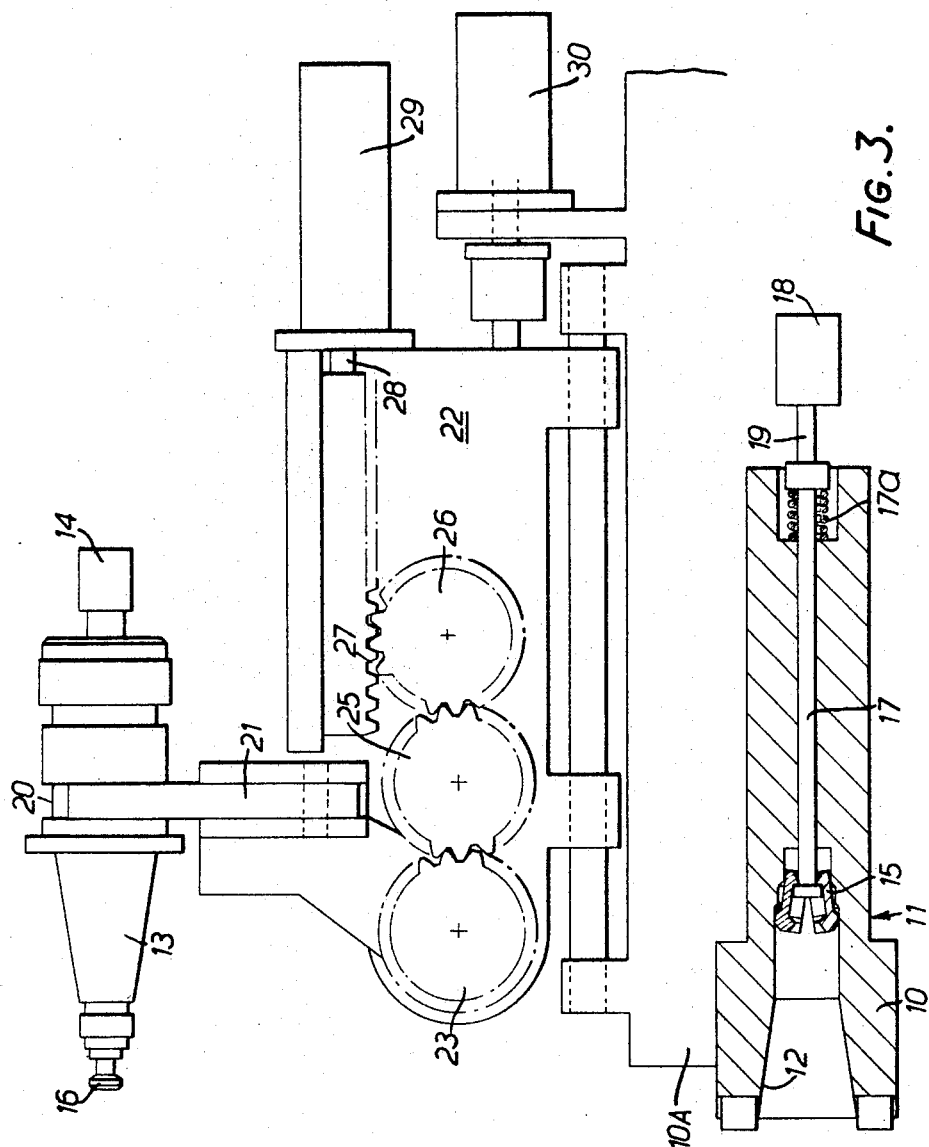
FIG. 3 is again a view similar to FIG. 1, but with the tool change mechanism at a further position in its cycle of operation.

The associated machine tool of which the tool-change mechanism effectively forms a part, includes a spindle 10 and a chuck 11 having a frusto-conical tapering recess 12 for reception of the complementary shank 13 of a working tool 14 and at the narrower end of the recess includes a collet 15 which is capable of engaging a button 16 at the end of the shank 13 remote from the working end of the tool.

The spindle 10 must be arrested at a predetermined position in order to allow a tool to be changed, because the drive to the spindle is through a dog clutch (not shown), and by stopping the spindle at a predetermined position it is a straightforward matter to re-engage the dog clutch. Means ((not shown) to stop the spindle at a predetermined position are therefore provided. The operation of the collet 15 is controlled by a drawbar 17 which is spring-biassed by a spring 17A to close the jaws of the collet 15. A hydraulic cylinder and piston arrangement 18 with a rod 19 connected to the piston and extending out of the cylinder is disposed to engage the end of the drawbar 17 remote from the collet 15 in order to overcome the spring bias acting on the drawbar and thus to open the jaws of the collet 15. Each tool is of generally conventional construction but preferably has an annular groove 20 which can be engaged and gripped by a corresponding transfer arm 21.

Figure 4:
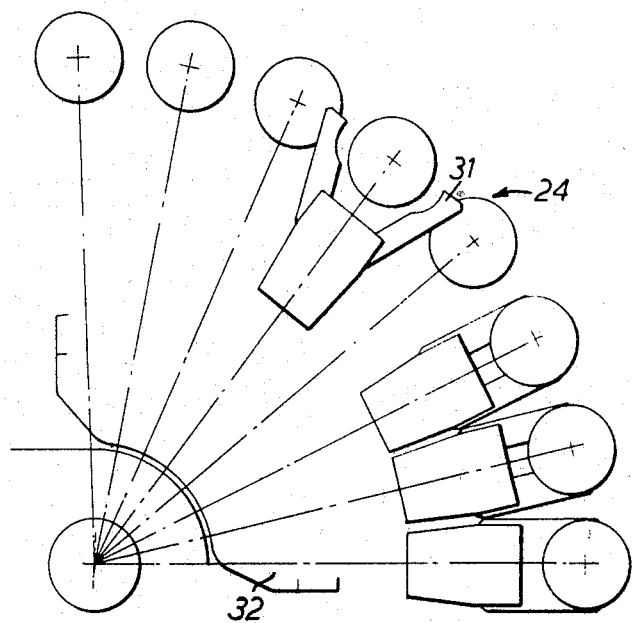
FIG. 4 is a fragmentary end view of the mechanism.

The spindle 10 forms part of the headstock 10A of the machine tool, which headstock is partly surrounded by a semi-circular array of transfer arms 21 (see FIG. 4) mounted on a carriage 22. Each transfer arm 21 is rigid with a gear wheel 23 and carries clamp means 24 capable of engaging the associated tool at and adjacent the annular groove 20 thereof. The gear wheel 23 meshes with a second gear wheel 25 which in turn meshes with a pinion 26 meshing with the teeth of a rack 27. Each rack 27 is rigid with a piston rod 28 of a further hydraulic cylinder 29 and admission of pressure fluid to the cylinder 29 causes the rack 27 to move linearly and correspondingly rotate the associated transfer arm 21 from the parked position (FIG. 1) in which the corresponding tool is inoperative to a position adjacent the spindle 10 where the clamp means 24 is opened and the tool engaged by the spindle 10. It will be appreciated, that each tool has a corresponding transfer arm 21 and clamp means 24 and that operation of the rack 27 by the hydraulic cylinder 29 of any given transfer arm 21 is controlled by a programme tape (not shown) which serves to operate the machine tool as a whole.

The carriage 22 of the transfer arm 21 is movable as a whole from a retracted position to an extended position by means of a still further hydraulic cylinder and piston arrangement 30.

Each clamping means includes two jaws 31 which are actuated by a cam 32 or other mechanism to open just before the associated tool is offered up to the spindle 10 of the machine tool. Alternatively, the tool may be released only after engagement in the spindle.

When the programme tape or other control medium indicates that a tool change is required in order to continue the machining of a particular work-piece, the following sequence of operations takes place.

A signal is received from the programme tape reader apparatus (not shown) which stops the spindle of the machine at a predetermined angular position. A further signal operates mechanism which retracts the work-piece (not shown) from the spindle 10 and a third signal brings the tool change mechanism carriage 22 to its extended position by means of the hydraulic cylinder 30. The transfer arm 21 of the tool present in the machine spindle is moved in a circular arc from its parking position when the carriage 22 is in the extended position to a position where the clamp means 24 is aligned with the tool 14, by means of the associated hydraulic cylinder 29, the rack 27 and the gear wheels 23, 25 and 26. The jaws 31 of the clamp means are opened during the latter movement. The jaws of the transfer arm now grip the tool 14 at its annular groove 20 and the drawbar 17 is moved against its spring bias by the associated hydraulic cylinder and piston 18 to release the collet 15 and by direct mechanical action to slacken the grip of the tapered recess 12 of the spindle 10 on the complementary tapered shank of the tool. The carriage 22 of the tool change mechanism then moves forwardly thus enabling the collet jaws 15 completely to release the button 16 at the end of the tool. The tool thus being freed from the spindle 10 can be rotated by the transfer arm back to its parking position, the carriage 22 remaining, however, in the fully extended forward position.

The control tape then selects for operation the next hydraulic cylinder 29 associated with the desired fresh tool and when the cylinder is actuated the associated transfer arm 21 moves the fresh tool 14 through a semi-circular arc into the tapered recess 12 of the spindle. The carriage 22 is then retracted enabling the tool button 16 to be presented to the collet 15 and the drawbar 17 is released by its associated hydraulic cylinder 18, the drawbar then being retracted by its spring loading, causing the collet jaws 15 to clamp on to the button 16. Once the tool button 16 has been engaged by the collet 15, the jaws 31 of the clamping means 24 of the transfer arm 21 are opened and the associated hydraulic cylinder 29 and piston returns the transfer arm to its parked position, the tool thereof having been left securely engaged in the spindle 10.

The whole of the tool change mechanism is then withdrawn to the fully retracted position by the hydraulic cylinder 30 and the workpiece again offered up ready for operation opposite to the spindle and the fresh tool.

I claim:

1. In a machine having a tool engaging means, a tool change mechanism comprising,
    a plurality of arms each capable of storing one tool for use in a machine with which the mechanism is associated, said arms being arranged in an arcuate array which at least partially surrounds said tool-engaging means, and
    means operably connected to said arms to move a selected one of said arms inwardly along an arcuate path to a position in front of the said tool-engaging means and thence along a linear path until the said selected one of said arms presents the corresponding tool to the said tool-engaging means.

2. In a tool-change mechanism for use in association with a machine tool:
    a plurality of arms each capable of storing one tool for use in said machine,
    first means for moving a selected said arm along a linear path from a storage station to a ready station, and
    second means for moving a selected said arm from said ready station through an arc of substantially 180° to a station immediately in front of a tool-engaging means of the machine,
    said first means also being operable for moving said selected arm along a linear path until the said selected arm presents the corresponding tool to the said tool-engaging means.

3. A mechanism according to claim 1, wherein each said arm moving means comprises:
    a hydraulic cylinder and piston assembly,
    a rack movable with the piston, and
    a plurality of gear wheels movable by said rack and coupled to a respective said arm.

4. A mechanism according to claim 3, including three said gear wheels associated with each transfer arm.

5. A mechanism according to claim 1, wherein said arms are arranged in a semi-circular array.

6. A mechanism according to claim 1, wherein said moving means comprises a carriage on which the arms are mounted, said carriage being movable together with the arms along a path parallel to the axis of the tool holding means of the said machine.

7. In a machine tool comprising, a tool holding spindle, and a chuck within said spindle, the improvement comprising:
    a drawbar coupled to said chuck,
    spring means biassing the drawbar so as to close the chuck,
    hydraulic means for overcoming the spring bias to open the chuck,
    a tool-change mechanism for selectively offering up tools to said spindle in a predetermined sequence, said mechanism including:
        a plurality of tool-holding arms arranged in a semi-circular array
        a carriage on which the arms are mounted,
        hydraulic means for moving the carriage along a linear path from a retracted to an extended position, and
        means for moving a selected arm from said extended position through a semi-circular path to a position at which said selected arm presents the tool in alignment with the spindle, said carriage being retractable to bring said selected tool into engagement with the chuck.

References Cited

UNITED STATES PATENTS

| | | | |
|---|---|---|---|
| 3,298,098 | 1/1967 | Gleisner | 29—568 |
| 3,052,011 | 9/1962 | Brainard et al. | 29—568 |
| 3,273,235 | 9/1966 | Dziedzic et al. | 29—568 |

FRANCIS S. HUSAR, Primary Examiner